(12) United States Patent
Smith et al.

(10) Patent No.: US 10,293,874 B2
(45) Date of Patent: May 21, 2019

(54) SELF MOUNTING BALLAST WEIGHT SYSTEM

(71) Applicant: AGCO Corporation, Hesston, KS (US)

(72) Inventors: Evan Thomas Smith, Jackson, MN (US); Derek Hruska, Lime Springs, IA (US)

(73) Assignee: AGCO Corporation, Duluth, GA (US)

( * ) Notice: Subject to any disclaimer, the term of this patent is extended or adjusted under 35 U.S.C. 154(b) by 11 days.

(21) Appl. No.: 15/497,794

(22) Filed: Apr. 26, 2017

(65) Prior Publication Data

US 2017/0305481 A1    Oct. 26, 2017

Related U.S. Application Data

(60) Provisional application No. 62/327,488, filed on Apr. 26, 2016.

(51) Int. Cl.
*B62D 49/06*    (2006.01)
*B62D 49/08*    (2006.01)

(52) U.S. Cl.
CPC ....... *B62D 49/0628* (2013.01); *B62D 49/085* (2013.01)

(58) Field of Classification Search
CPC ................ B62D 49/0628; B62D 49/085
See application file for complete search history.

(56) References Cited

U.S. PATENT DOCUMENTS

| | | |
|---|---|---|
| 3,135,404 A | 6/1964 | Pilch |
| 3,595,410 A | 7/1971 | Lemmon |
| 4,462,477 A * | 7/1984 | Mastro .................... B60G 5/02 172/7 |
| 4,518,305 A | 5/1985 | Stuhrmann |
| 4,659,102 A | 4/1987 | Stuhrmann et al. |

(Continued)

FOREIGN PATENT DOCUMENTS

| | | |
|---|---|---|
| CN | 104878798 A | 9/2015 |
| DE | 102005040954 A1 | 12/2006 |

(Continued)

OTHER PUBLICATIONS

UK Intellectual Property Office, International Search Report for related UK Application No. GB1609272.8, dated Nov. 18, 2016.

*Primary Examiner* — Barry Gooden, Jr.

(57) ABSTRACT

A working vehicle has a ballast weight system including a fulcrum mounted on the vehicle frame and a ballast weight configured to pivot between a mounting configuration with the ballast weight is resting on the ground and an operational configuration with the ballast weight is carried by the vehicle frame. The ballast weight has a mounting arm and a lower corner portion. The mounting arm has a recess configured to interact with the fulcrum, wherein in the mounting configuration, the recess faces sideways such that the work vehicle is driven towards the ballast weight until the fulcrum interfaces with the recess. A catch mechanism secures the ballast weight to the fulcrum. A lift mechanism attaches between the ballast weight and the vehicle frame such that the lift mechanism pushes on the corner portion to pivot the ballast weight about the fulcrum. A latch mechanism pins the ballast weight in the operational position.

8 Claims, 6 Drawing Sheets

(56) References Cited

U.S. PATENT DOCUMENTS

| | | | | |
|---|---|---|---|---|
| 4,664,404 | A * | 5/1987 | Schultz | B62D 49/085 |
| | | | | 172/611 |
| 6,227,304 | B1 * | 5/2001 | Schlegel | A01B 59/064 |
| | | | | 172/439 |
| 6,471,245 | B1 | 10/2002 | Schott | |
| 8,419,064 | B2 * | 4/2013 | Erhardt | B62D 49/0628 |
| | | | | 224/519 |
| 8,434,787 | B2 | 5/2013 | Halepatali et al. | |
| 8,925,964 | B1 | 1/2015 | Duppong et al. | |
| 9,663,158 | B2 * | 5/2017 | Jutz | B62D 49/0628 |
| 10,066,365 | B2 * | 9/2018 | Cartechini | E02F 9/18 |
| 2006/0103125 | A1 * | 5/2006 | Yamamoto | B62D 49/085 |
| | | | | 280/760 |
| 2008/0129028 | A1 * | 6/2008 | Hamm | B62D 49/085 |
| | | | | 280/759 |
| 2009/0043461 | A1 * | 2/2009 | Bordini | B62D 37/04 |
| | | | | 701/50 |
| 2010/0117346 | A1 | 5/2010 | Bauer et al. | |
| 2015/0097362 | A1 * | 4/2015 | Jutz | B62D 49/0628 |
| | | | | 280/759 |
| 2017/0305481 | A1 * | 10/2017 | Smith | B62D 49/085 |
| 2018/0162462 | A1 * | 6/2018 | Letscher | B62D 37/04 |

FOREIGN PATENT DOCUMENTS

| | | | |
|---|---|---|---|
| EP | 0126263 | A2 | 11/1984 |
| GB | 2038284 | A | 7/1980 |

* cited by examiner

SELF MOUNTING BALLAST WEIGHT SYSTEM

CROSS REFERENCE TO RELATED APPLICATION

This application claims the benefit of U.S. Provisional Application No. 62/327,488 filed Apr. 26, 2016, which is hereby incorporated by reference in its entirety.

BACKGROUND OF THE INVENTION

Field of Invention

This invention relates generally to ballast weight systems for a work vehicle, and more particularly to a self-mounting ballast weight system.

Description of Related Art

Off-road work vehicles, including agricultural tractors, often need to add front-end weights or ballast to the vehicle to improve balance, stability, or traction. As tractor power and the horsepower-to-weight ratio have increased over the years, the problem of attaching ballast to tractors has become more pronounced since the amount of ballast required for some operations can be thousands of pounds.

Most often, additional ballast options for tractors require manual removal of the weight, or an additional vehicle or hoist mechanism to lift the weight on or off the weighted vehicle. This requires that a tractor be driven to wherever the hoist is located, which is time consuming, especially if the tractor is in a remote area when it becomes necessary to add ballast.

It would be desirable to have a system that does not need to manually lift the weights or use a second vehicle or external lifting system to install the weight.

OVERVIEW OF THE INVENTION

In one aspect, the invention is directed to a working vehicle having a vehicle frame and a ballast weight system mounted on a front end region of the vehicle frame. The ballast weight system includes a fulcrum mounted on the vehicle frame and a ballast weight configured to pivot between a mounting configuration in which the ballast weight is resting on the ground in a condition to be mounted on the working vehicle and an operational configuration in which the ballast weight is carried by the vehicle frame. The ballast weight has a body portion with a ground interfacing surface that is downward facing when the ballast weight is resting on the ground and forward facing when the ballast weight is pivoted to the operational configuration, wherein the ballast weight has a mounting arm and a lower corner portion. The upper mounting arm has a recess formed therein configured to interact with the fulcrum, wherein in the mounting configuration, the recess faces sideways such that the work vehicle can be driven towards the ballast weight until the fulcrum interfaces with the recess. The ballast weight system has a catch mechanism configured to secure the ballast weight to the fulcrum. The ballast weight system has a lift mechanism attached between the ballast weight and the vehicle frame such that the lift mechanism pushes on the corner portion to pivot the ballast weight about the fulcrum between the mounting position to the operational position. The ballast weight system has a latch mechanism used to pin the ballast weight in the operational position. In one aspect, the lift mechanism is a hydraulic cylinder with a rod end mounted to a cylinder bracket on the vehicle frame and a piston end mounted to the corner portion of the ballast weight. In one aspect, the latch mechanism has at least one latch portion with an eye thereon on the vehicle frame and a latch portion with an eye on the ballast weight, the eye on the ballast weight aligning with the eye of the latch portion on the vehicle frame when the ballast weight is in the operational position, and a pin passing through the eyes in the latch portions to hold the ballast weight in the operational position.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
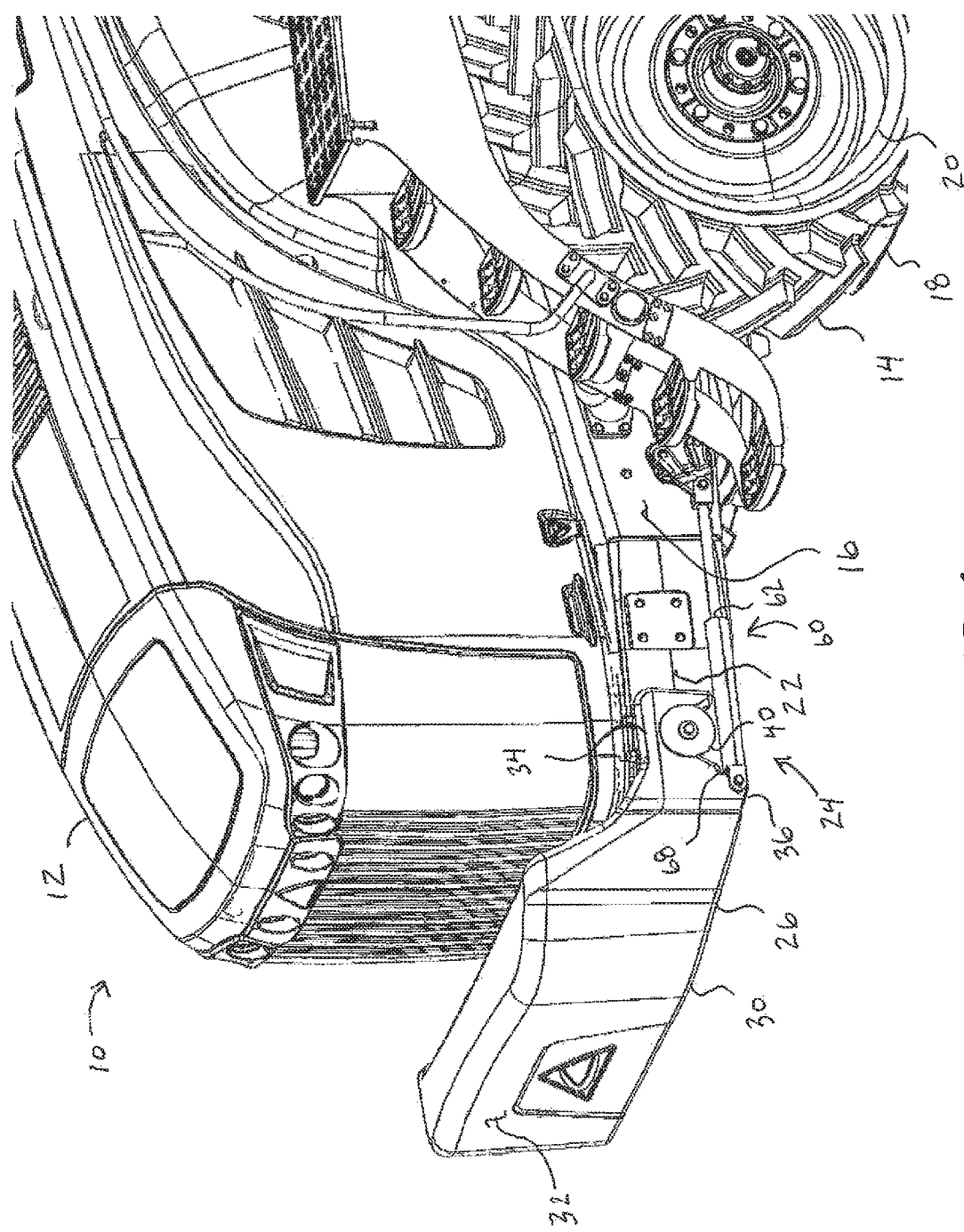
FIG. 1 is a perspective view of a working vehicle with a ballast weight system embodying the present invention.
Figure 2:
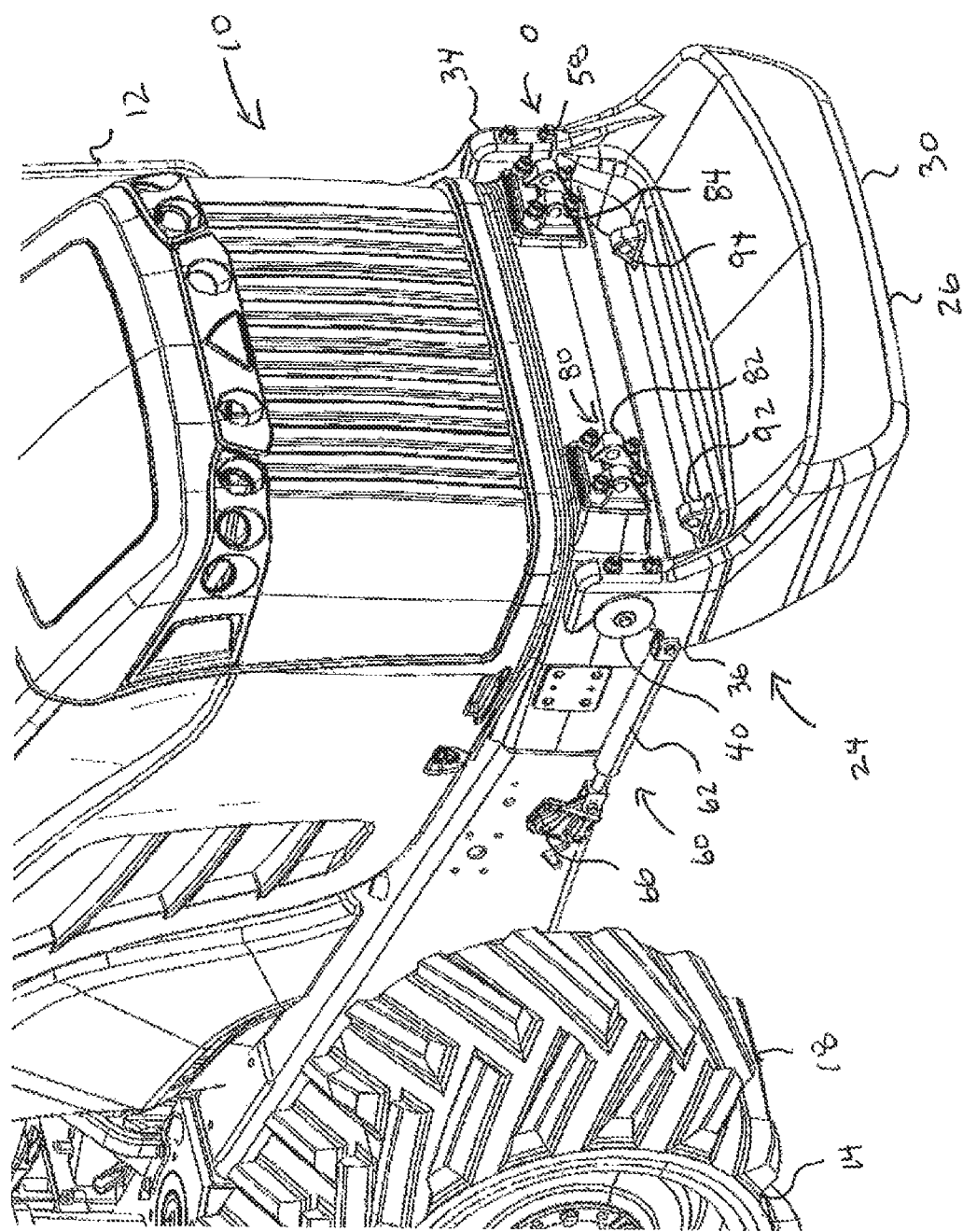
FIG. 2 is another perspective view of the working vehicle and ballast weight system of FIG. 1 with the ballast weight in a mounting condition.

FIG. 1 illustrates a front part of a working vehicle 10 with a cover hood 12 and an undercarriage assembly 14 configured to drive the working vehicle over ground. In one embodiment, the working vehicle 10 is an agricultural tractor, for which it is particularly well suited, however the present invention may be used on a variety of tracked or wheeled work vehicles and should only be limited by the claims that follow. The hood 12 is fitted onto a vehicle frame 16. In the illustrated embodiment, the undercarriage assembly 14 includes a ground engaging endless track belt 18 entrained about a front wheel 20 and driven by a propulsion system (not shown) of the working vehicle 10 as would be understood by one skilled in the art. Mounted in a front end region 22 of the vehicle frame 16 is a ballast weight system 24. The ballast weight system 24 is desirably formed symmetrically with respect to a vertical longitudinal central plane of the working vehicle 10. Both sides of the ballast weight system 24 are shown in the different Figures herein, and like components of the ballast weight system 24 located on the different sides of the work vehicle 10 are referenced using like reference numbers. For the purposes of simplification in the description, terms such as front, rear, rearward, left, right, up and down are used hereinafter, it being appreciated that such terms relate to the direction of forward movement of the tractor. Accordingly, FIG. 1 shows the front end region 22 of the working vehicle 10 from the left-hand side thereof and FIG. 2 shows the front end region 22 from the right-hand side.

Figure 3:
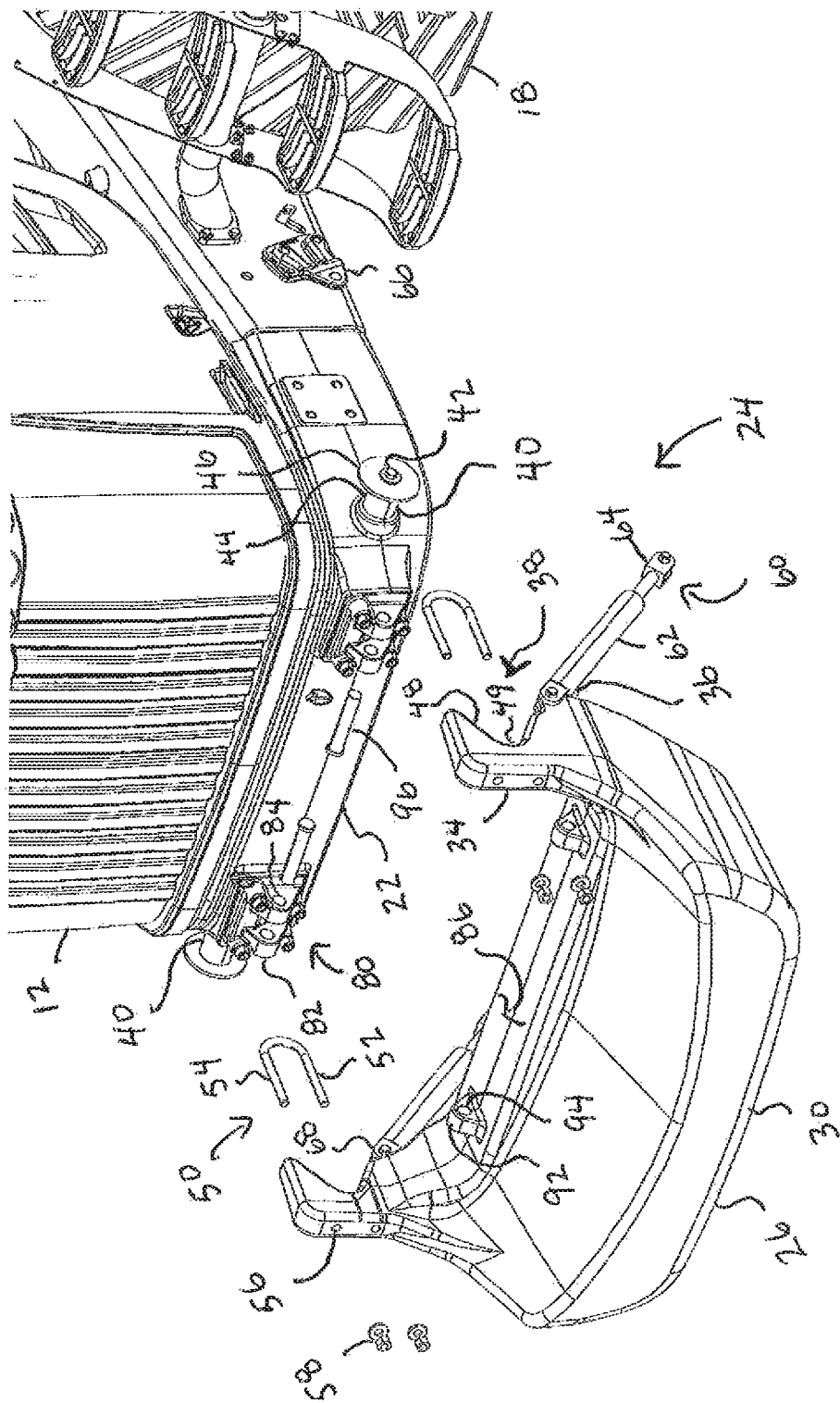
FIG. 3 is an exploded perspective view of the working vehicle with the ballast weight system of FIG. 1.

The ballast weight system 24 comprises a ballast weight 26 mountable on the front end region 22 of the work vehicle. FIG. 1 shows the ballast weight system 24 with the ballast weight 26 in an operational configuration on the work vehicle 10 such that the ballast weight 24 improves stability or traction of the vehicle as would be understood by one skilled in the art. Turning also now to FIGS. 2 and 3, the ballast weight system 24 is configured to pivot the ballast weight 26 to a mounting configuration as shown in FIG. 2 in which the ballast weight 26 is resting on the ground and also configured to release the ballast weight 26 as shown in FIG. 3 such that the ballast weight 26 is removed from the work vehicle 10. Advantageously, the ballast weight system 24 is configured to transition from the operational configuration of FIG. 1 to the released configuration of FIG. 3 and back again to the operation configuration without the need of an external hoist or lifting system for the ballast weight 26.

Figure 4:
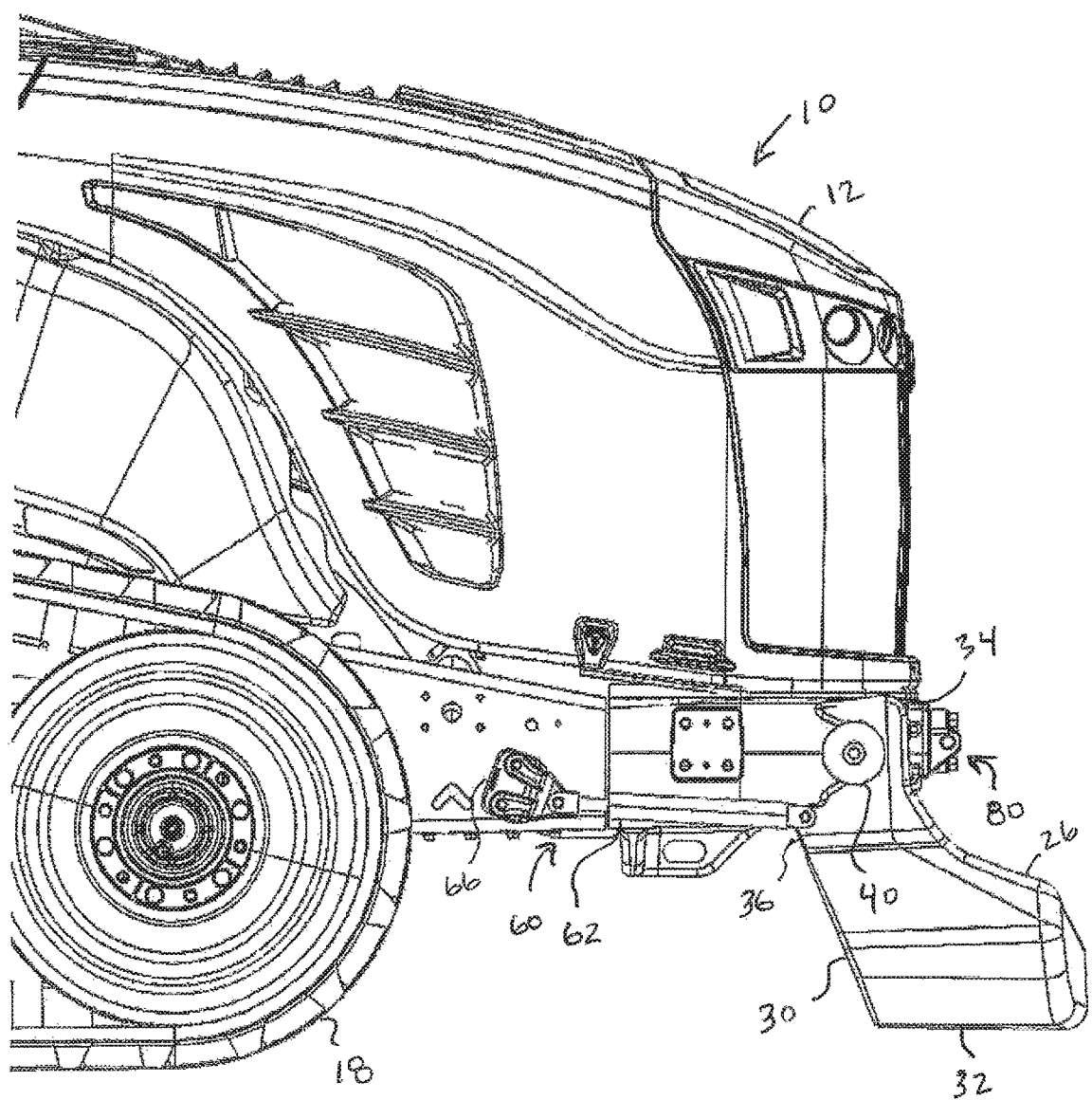
FIG. 4 is a side elevational view of the working vehicle with the ballast weight in a mounting condition.

The ballast weight 26 has a body portion 30 with a ground interfacing surface 32 that is downward facing when the ballast weight is resting on the ground and forward facing when the ballast weight 26 is pivoted to the operational configuration. Extending from the body portion 30 is an upper mounting arm 34 and a lower corner portion 36. The upper mounting arm 34 has a recess 38 formed therein configured to interact with a fulcrum 40. The fulcrum 40 is mounted on the vehicle frame 16 so as to be capable of sustaining the weight of the ballast weight 26. In the illustrated embodiment the fulcrum 40 is bolted to the vehicle frame 16 with bolt 42, however, other means for mounting the fulcrum 40 to the work vehicle 10 may be used using sound engineering judgment. Desirably, the fulcrum 40 has a pin section 44 that interfaces with the mounting arm 34 and an outer holding structure 46 useful to keep the pin section 44 in the recess 38. With the ground interfacing surface 32 of the ballast weight 26 resting on the ground as shown in FIGS. 2 and 4, the recess 38 faces sideways such that the work vehicle 10 can be driven towards the ballast weight 26 until the fulcrum 40 interfaces with the recess 38 in the upper mounting arm 34. Desirably, sides 48 of the recess 38 slope inward toward an apex 49, allowing proper positioning of the ballast weight 26 on the fulcrum 40 even if there are slight differences in the height of the fulcrum 40 and the apex 49 of the recess 38.

When the mounting arm 34 is positioned on the fulcrum 40, a catch mechanism 50 is used to secure the ballast weight 26 to the fulcrum 40. In the illustrated embodiment, the catch mechanism 50 is a U-bolt 52 securing the mounting arm 34 to the fulcrum 40. Legs 54 of the U-bolt 52 pass through bores 56 in the mounting arm 34 where they are secured with suitable nuts 58. However, other means may be used for the catch mechanism 50 using sound engineering judgment.

Figure 5:
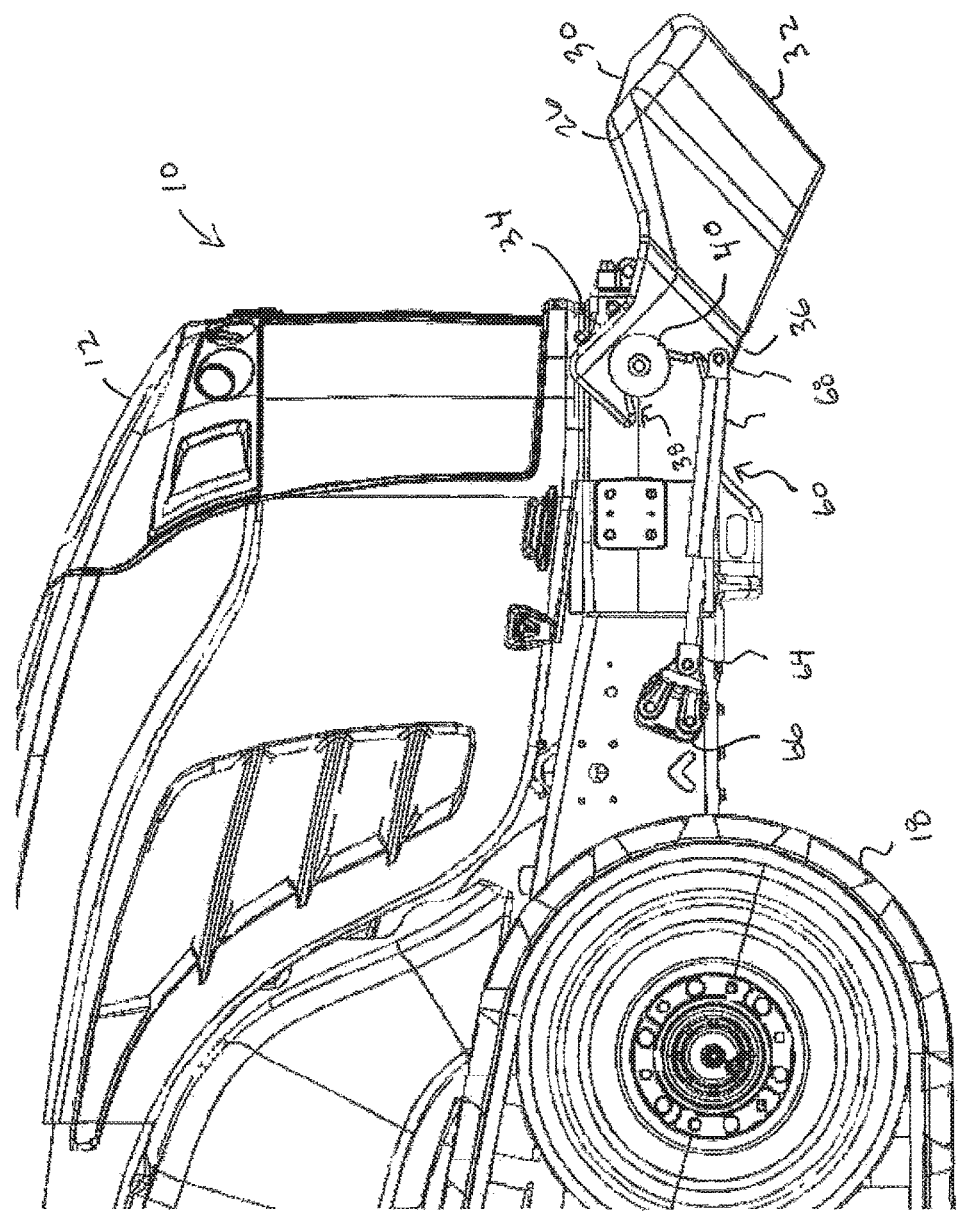
FIG. 5 is a side elevational view of the working vehicle with the ballast weight in an intermediate condition.
Figure 6:
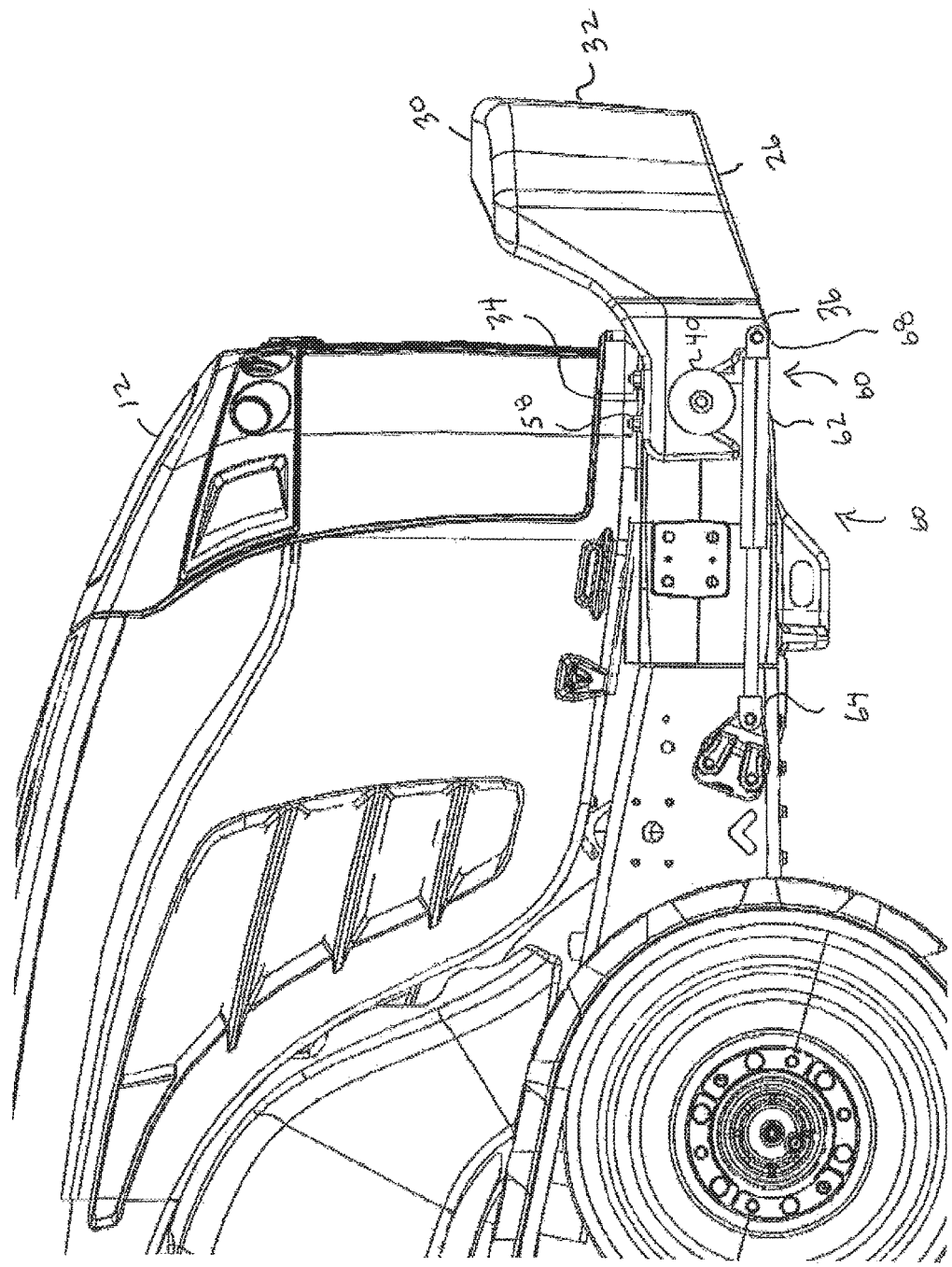
FIG. 6 is a side elevational view of the working vehicle with the ballast weight in an operational condition.

The ballast weight system 24 also includes a lift mechanism 60 attached between the ballast weight 26 and the vehicle frame 16. In the illustrated embodiment, the lift mechanism 60 is a hydraulic cylinder 62 with a rod end 64 mounted to a cylinder bracket 66 on the vehicle frame 16 and a piston end 68 mounted to the corner portion 36 of the ballast weight 26. However, one skilled in the art will understand that the hydraulic cylinder 62 may be mounted with the rod and piston ends 64, 68 facing the other direction. The hydraulic cylinder 62 is connected to the hydraulic system (not shown) of the work vehicle 10 such that it pushes on the corner portion 36 to pivot the ballast weight 26 about the fulcrum 40 between the rest position shown in FIG. 4 through an intermediate position shown in FIG. 5 to the operational position shown in FIG. 6. When it is desired to remove the ballast weight 26 from the work vehicle 10, the hydraulic cylinder 62 is used to pivot the ballast weight 26 and lower it to the ground.

The ballast weight system 24 also comprises a latch mechanism 80 used to secure the ballast weight 26 in the operational position. As best seen in FIGS. 2 and 3, the front end region 22 of the work vehicle 10 has at least one latch portion 82 with an eye 84 thereon and an vehicle facing surface 86 of the ballast weight 26 has a latch portion 92 with an eye 94 that aligns with the eye 84 of the latch portion 82 on the work vehicle 10 when the ballast weight 26 is in the operational position. A pin 96 passes through the eyes 84, 94 in the latch portions 82, 92 to hold the ballast weight 26 in the operational position. However, one skilled in the art will understand that other means may be used to form the latch mechanism 80 to hold the ballast weight 26 in the operational position using sound engineering judgment.

Thus, a difference between current invention and the prior art is in regards to the interface and motion between the ballast weight 26 and the work vehicle 10. Desirably, the current invention features a ballast weight system 24 without a sub structure to perform the raising or lowering of the ballast weight 26. The ballast weight 26 in the current invention only moves rotationally about an axis formed by the fulcrum 40 with minimal translation in the up/down or fore/aft directions.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A working vehicle having a vehicle frame and a ballast weight system mounted on a front end region of the vehicle frame, the ballast weight system comprising:
   a fulcrum mounted on the vehicle frame;
   a ballast weight configured to pivot between a mounting configuration in which the ballast weight is resting on the ground in a condition to be mounted on the working vehicle and an operational configuration in which the ballast weight is carried by the vehicle frame, wherein the ballast weight has a body portion with a ground interfacing surface that is downward facing when the ballast weight is resting on the ground and forward facing when the ballast weight is pivoted to the operational configuration, wherein the ballast weight has a mounting arm and a lower corner portion, the upper mounting arm having a recess formed therein configured to interact with the fulcrum, wherein in the mounting configuration, the recess faces sideways such that the work vehicle can be driven towards the ballast weight until the fulcrum interfaces with the recess;

a catch mechanism configured to secure the ballast weight to the fulcrum;

a lift mechanism comprising a hydraulic cylinder attached between the ballast weight and a cylinder bracket on the vehicle frame such that the lift mechanism pushes on the corner portion to pivot the ballast weight about the fulcrum between the mounting position to the operational position wherein the hydraulic cylinder has a rod end mounted to the cylinder bracket on the vehicle frame and a piston end mounted to the corner portion of the ballast weight; and a latch mechanism used to secure the ballast weight in the operational position.

2. The working vehicle of claim 1 wherein sides of the recess slope inward toward an apex, thereby allowing interfacing of the ballast weight on the fulcrum if there are slight differences in the height of the fulcrum and the apex of the recess.

3. The working vehicle of claim 1 wherein the lift mechanism is used to pivot the ballast weight from the operation configuration to the mounting configuration while lowering the ballast weight to the ground.

4. The working vehicle of claim 1 wherein the latch mechanism comprises at least one latch portion with an eye thereon on the vehicle frame and a latch portion with an eye on the ballast weight, the eye on the ballast weight aligning with the eye of the latch portion on the vehicle frame when the ballast weight is in the operational position, the latch mechanism further comprising a pin passing through the eyes in the latch portions to hold the ballast weight in the operational position.

5. A working vehicle having a vehicle frame and a ballast weight system mounted on a front end region of the vehicle frame, the ballast weight system comprising:

a fulcrum mounted on the vehicle frame;

a ballast weight configured to pivot between a mounting configuration in which the ballast weight is resting on the ground in a condition to be mounted on the working vehicle and an operational configuration in which the ballast weight is carried by the vehicle frame, wherein the ballast weight has a body portion with a ground interfacing surface that is downward facing when the ballast weight is resting on the ground and forward facing when the ballast weight is pivoted to the operational configuration, wherein the ballast weight has a mounting arm and a lower corner portion, the upper mounting arm having a recess formed therein configured to interact with the fulcrum, wherein in the mounting configuration, the recess faces sideways such that the work vehicle can be driven towards the ballast weight until the fulcrum interfaces with the recess;

a catch mechanism configured to secure the ballast weight to the fulcrum, wherein the catch mechanism is a U-bolt securing the mounting arm to the fulcrum, the U-bolt having legs that pass through bores in the mounting arm;

a lift mechanism attached between the ballast weight and the vehicle frame such that the lift mechanism pushes on the corner portion to pivot the ballast weight about the fulcrum between the mounting position to the operational position; and a latch mechanism used to secure the ballast weight in the operational position.

6. The working vehicle of claim 5 wherein sides of the recess slope inward toward an apex, thereby allowing interfacing of the ballast weight on the fulcrum if there are slight differences in the height of the fulcrum and the apex of the recess.

7. The working vehicle of claim 5 wherein the lift mechanism is used to pivot the ballast weight from the operation configuration to the mounting configuration while lowering the ballast weight to the ground.

8. The working vehicle of claim 5 wherein the latch mechanism comprises at least one latch portion with an eye thereon on the vehicle frame and a latch portion with an eye on the ballast weight, the eye on the ballast weight aligning with the eye of the latch portion on the vehicle frame when the ballast weight is in the operational position, the latch mechanism further comprising a pin passing through the eyes in the latch portions to hold the ballast weight in the operational position.

\* \* \* \* \*